(12) United States Patent
Nakayama et al.

(10) Patent No.: US 9,176,443 B2
(45) Date of Patent: Nov. 3, 2015

(54) INFRARED TEMPERATURE SENSOR AND FIXING DEVICE USING THE SAME

(71) Applicant: SHIBAURA ELECTRONICS, CO., LTD., Saitama (JP)

(72) Inventors: Noriyuki Nakayama, Saitama (JP); Morihisa Hamada, Saitama (JP); Tatsuya Konno, Saitama (JP); Shingo Maruyama, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 14/163,507

(22) Filed: Jan. 24, 2014

(65) Prior Publication Data
US 2014/0140712 A1 May 22, 2014

Related U.S. Application Data

(63) Continuation of application No. PCT/JP2011/004211, filed on Jul. 26, 2011.

(51) Int. Cl.
*G03G 15/20* (2006.01)
*G01J 5/04* (2006.01)
*G01J 5/10* (2006.01)
(Continued)

(52) U.S. Cl.
CPC ........... *G03G 15/2064* (2013.01); *G01J 5/0022* (2013.01); *G01J 5/045* (2013.01); *G01J 5/046* (2013.01); *G01J 5/0818* (2013.01); *G01J 5/0853* (2013.01); *G01J 5/10* (2013.01); *G01J 5/20* (2013.01); *G01J 5/24* (2013.01); *G03G 15/2039* (2013.01); *G01J 2005/068* (2013.01)

(58) Field of Classification Search
CPC .......... G03G 15/2039; G03G 15/2064; G03G 15/2003; G03G 15/2014
See application file for complete search history.

(56) References Cited

U.S. PATENT DOCUMENTS

| 2004/0031924 A1* | 2/2004 | Cho et al. ........................ 250/353 |
| 2008/0219722 A1* | 9/2008 | Sone et al. ..................... 399/328 |
| 2009/0239440 A1* | 9/2009 | Kang .............................. 446/81 |

FOREIGN PATENT DOCUMENTS

| EP | 0875197 A1 | 11/1998 |
| EP | 1324012 A2 | 7/2003 |

(Continued)

OTHER PUBLICATIONS

International Search Report for application No. PCT/JP2011/004211 dated Sep. 6, 2011.

(Continued)

*Primary Examiner* — Roy Y Yi
(74) *Attorney, Agent, or Firm* — Pearne & Gordon LLP

(57) ABSTRACT

An infrared temperature sensor including: a sensor case made of metal and including a first airspace (a light guiding region) that guides infrared rays entering from an infrared entrance window, and a second airspace (a light shielding region) that is adjacent to the light guiding region via a partition wall, and where an upper wall that blocks entrance of the infrared rays is formed on an entrance side of the infrared rays; a film that absorbs the infrared rays reaching the film through the light guiding region, and converts the infrared rays to heat; a sensor cover that is made of metal and arranged opposing the sensor case via the film; an infrared detection element and a temperature compensation element arranged on the film, wherein the light guiding region and the light shielding region have substantially symmetrical forms with respect to the partition wall.

7 Claims, 16 Drawing Sheets

(51) Int. Cl.
*G01J 5/08* (2006.01)
*G01J 5/20* (2006.01)
*G01J 5/24* (2006.01)
*G01J 5/00* (2006.01)
*G01J 5/06* (2006.01)

(56) References Cited

FOREIGN PATENT DOCUMENTS

| | | | |
|---|---|---|---|
| JP | 2002-156284 | A | 5/2002 |
| JP | 2003-194630 | A | 7/2003 |
| JP | 2003-215974 | A | 7/2003 |
| JP | 2003-322344 | A | 11/2003 |
| JP | 2008-111849 | A | 5/2008 |
| JP | 2011-075365 | A | 4/2011 |
| WO | 2011/074678 | A1 | 6/2011 |

OTHER PUBLICATIONS

Extended European Search Report for Application No. 11869941.2 dated May 11, 2015.

* cited by examiner

FIG. 1A
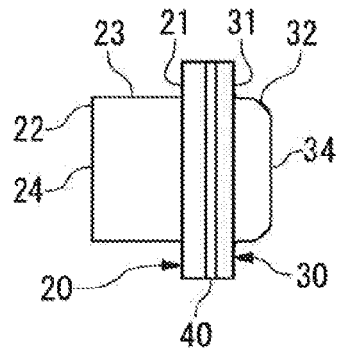
FIG. 1D
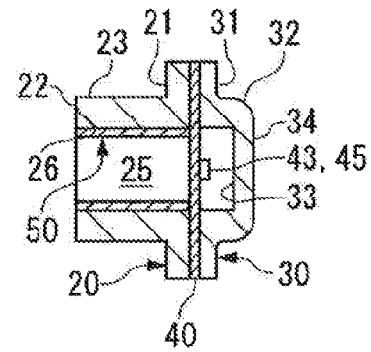
FIG. 1B   FIG. 1C
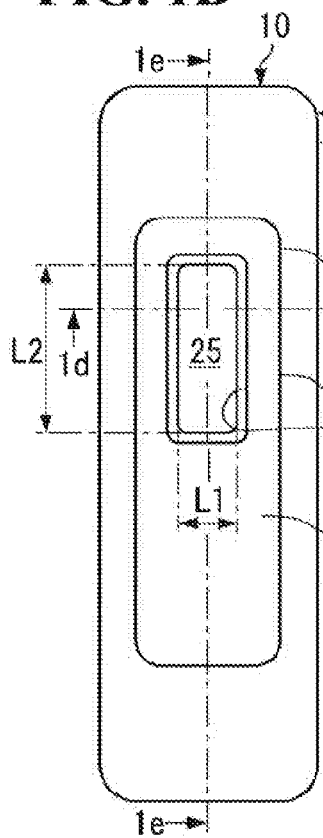
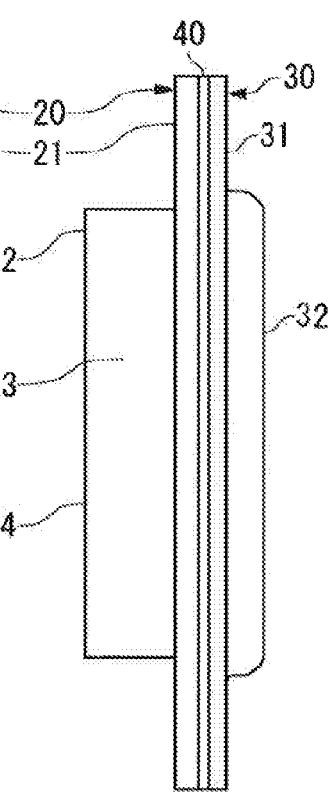
FIG. 1E
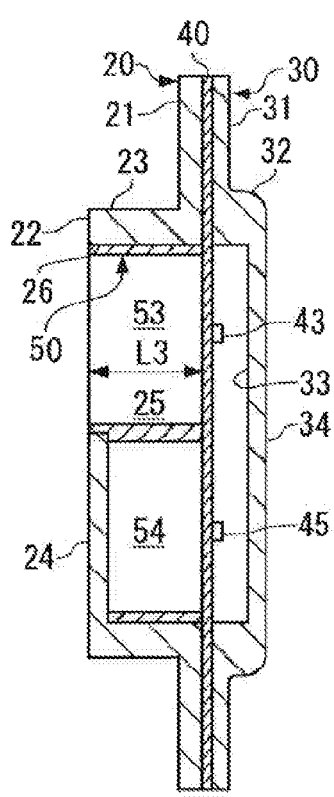

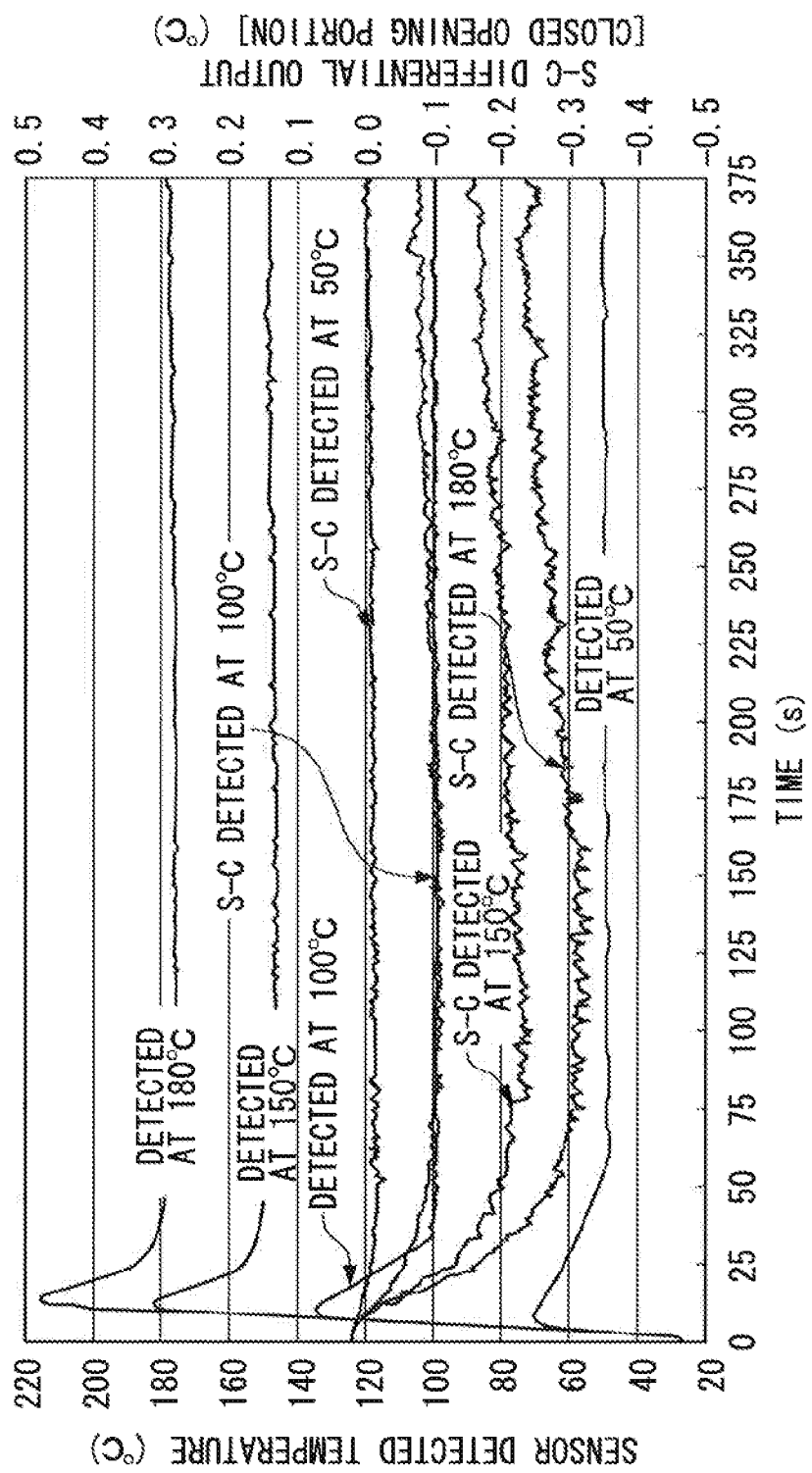

INFRARED TEMPERATURE SENSOR AND FIXING DEVICE USING THE SAME

TECHNICAL FIELD

The present invention relates to an infrared temperature sensor which detects a temperature of an object to be detected in a non-contact manner, and a toner fixing device for use in an image forming apparatus, such as a copy machine and a printer, using the infrared temperature sensor.

BACKGROUND ART

As a toner fixing device for use in an image forming apparatus such as a copy machine and a printer, a device using a fixing method of heating unfixed toner while moving a recording paper after forming a toner image to be held on the recording paper corresponding to image information by an electrophotographic operating process is generally used.

The fixing device fuses the toner (made of a resin material, a magnetic material, and a colorant) by moving the recording paper and the toner held on the recording paper by static electricity while sandwiching the recording paper and the toner between fixing means composed of a roller that conveys the recording paper and the toner while rotating, and pressurizing means composed of a roller that rotates in an opposite direction from the fixing means in press contact therewith and applying heat and pressure thereto, and thereby fixes the toner onto the recording paper.

A temperature of the roller greatly affects an image quality. Thus, the temperature of the roller is controlled by detecting a temperature of a roller surface by using a sensor.

There is known an infrared temperature sensor which detects the temperature of the roller in a non-contact manner so as to avoid damage to the roller of the fixing device (e.g., Patent Literatures 1 and 2). The infrared temperature sensor includes an infrared detection element and a temperature compensation element, so that the infrared detection element detects a heat emission amount of infrared rays from the roller as the fixing means that is an object to be detected, and the temperature compensation element further detects an atmosphere temperature to perform temperature compensation, thereby specifying the temperature of the object to be detected.

CITATION LIST

Patent Literature

Patent Literature 1:
    Japanese Patent Laid-Open No. 2008-111849
Patent Literature 2:
    Japanese Patent Laid-Open No. 2002-156284

SUMMARY OF INVENTION

Technical Problem

The infrared temperature sensors disclosed in Patent Literatures 1 and 2 are considered to be able to quickly and accurately measure the surface temperature of the object to be detected.

However, under a severe temperature detection environment, the conventional infrared temperature sensors may not be able to accurately detect the temperature. Examples thereof include a case in which the object to be detected (the roller) has a high temperature, and there is a large temperature gradient between the object to be detected and the infrared temperature sensor, and a case in which the object to be detected has a rapid temperature change.

The present invention has been made in view of the technical problem as described above, and an object thereof is to provide an infrared temperature sensor which can accurately measure a surface temperature of an object to be detected even under a severe temperature detection environment.

It is also an object of the present invention to provide a fixing device using the infrared temperature sensor.

Solution to Problem

For example, in temperature detection of a roller of a printer, on-demand machines have a high rate of roller temperature rise, and when an infrared temperature sensor is arranged adjacent to the roller, the entire sensor is susceptible to the influences of heat conduction and convection generated from the roller. Accordingly, a temperature of the sensor itself is rapidly changed, and it becomes difficult for a temperature compensation element to accurately detect the temperature of the sensor itself. The accuracy of temperature compensation is thereby lowered, so that an error occurs in a detection result of the object to be detected. At this point, when the same heat energy is applied to an infrared detection element and the temperature compensation element except for radiation of infrared rays, only infrared energy can be accurately detected.

An infrared temperature sensor according to the present invention made based on the above viewpoint is a sensor which detects a temperature of an object to be detected in a non-contact manner, the sensor including a sensor case that is made of metal and includes a light guiding region and a light shielding region. The light guiding region guides infrared rays entering from an entrance window. The light shielding region is adjacent to the light guiding region via a partition wall, and a shielding wall that blocks entrance of the infrared rays is formed on an entrance side of the infrared rays.

In the sensor according to the present invention, a film is arranged opposing the light guiding region and the light shielding region. The film absorbs the infrared rays that reach the film through the light guiding region, and converts the infrared rays to heat. The sensor according to the present invention also includes a sensor cover that is made of metal and arranged opposing the sensor case via the film, an infrared detection element that is arranged at a position on the film corresponding to the light guiding region, and a temperature compensation element that is arranged at a position on the film corresponding to the light shielding region.

In the sensor according to the present invention having the aforementioned configuration, the light guiding region and the light shielding region have substantially symmetrical forms with respect to the partition region. Because of the feature, the infrared detection element and the temperature compensation element are allowed to receive the equivalent heat energy except for radiation of the infrared rays, so that only heat energy by the radiation of the infrared rays can be accurately detected by obtaining a difference between a detected temperature by the infrared detection element and a detected temperature by the temperature compensation element.

Forming the sensor case and the sensor cover of metal contributes to a uniform temperature change of the entire infrared temperature sensor by following an ambient temperature change.

In the sensor according to the present invention, the sensor case includes an airspace corresponding to the light guiding region and the light shielding region. The sensor according to the present invention has another feature that the light guiding region, the light shielding region and the partition wall are formed by fitting an infrared absorption molded body to the airspace.

Normally, to capture only the infrared rays directly entering from the object to be detected by the infrared detection element, an infrared absorption film that absorbs the infrared rays is formed around the light guiding region that guides the infrared rays by a method such as painting or anodization. Since the infrared absorption film affects temperature detection accuracy due to a variation or unevenness in a film thickness, it is necessary to control film formation; however, since a portion where the infrared absorption film needs to be formed is an inner wall of a tubular light guiding portion, it is difficult to control the film thickness, thereby causing a variation in detection accuracy, and causing a cost increase of the film formation process.

To the contrary, when the infrared absorption molded body is fabricated by, for example, injection molding, the infrared absorption molded body functions similarly to the infrared absorption film, high dimensional accuracy is obtained, and the infrared absorption molded body is easily fitted to the sensor case, so that costs are lowered.

The sensor according to the present invention may include a detection circuit composed of a bridge circuit including the infrared detection element, first resistance connected in series with the infrared detection element, the temperature compensation element, and second resistance connected in series with the temperature compensation element, the first resistance and the second resistance forming opposing resistance. In the detection circuit, when a difference between a first middle point voltage between the infrared detection element and the first resistance and a second middle point voltage between the temperature compensation element and the second resistance is employed as an infrared output voltage, and the second middle point voltage is employed as a temperature compensation output voltage, variable resistance whose resistance value is variable is preferably used as the first resistance.

In the sensor including the detection circuit, even when there are a pairing error between the infrared detection element and the temperature compensation element and a pairing error between the first resistance and the second resistance, the pairing errors can be canceled by correction by adjusting the resistance value of the first resistance connected in series with the infrared detection element. Accordingly, a detection error of the sensor caused by the pairing errors in the detection elements and the resistance can be suppressed, and it also becomes unnecessary to use elements or resistance paired with high accuracy, thereby reducing product costs by using inexpensive elements and resistance.

While other preferable forms applied to the present invention are described in an embodiment described below, the present invention provides a toner fixing device including the infrared temperature sensor. The fixing device includes a first roller as fixing means, a second roller as pressurizing means, and a temperature sensor that detects a temperature of one or both of the first roller and the second roller.

Advantageous Effects of Invention

In accordance with the present invention, the infrared detection element and the temperature compensation element are allowed to receive the equivalent heat energy except for radiation of the infrared rays, so that only heat energy by the radiation of the infrared rays can be accurately detected by obtaining a difference between a detected temperature by the infrared detection element and a detected temperature by the temperature compensation element. As a result, the infrared temperature sensor which can accurately measure the surface temperature of the object to be detected even under a severe temperature detection environment can be provided.

BRIEF DESCRIPTION OF DRAWINGS

FIGS. 1A to 1E are views illustrating an infrared temperature sensor (a present embodiment) according to the present embodiment: FIG. 1A is a front view; FIG. 1B is a plan view; FIG. 1C is a side view; FIG. 1D is a sectional view on an arrow 1d-1d in FIG. 1A; and FIG. 1E is a sectional view on an arrow 1e-1e in FIG. 1A.

FIG. 2A is a plan view; and FIG. 2B is a side view.

FIG. 3A is a view corresponding to FIG. 1D; and FIG. 3B is a view corresponding to FIG. 1E.

FIGS. 4A and 4B show a result of a temperature detection experiment: FIG. 4A shows a result by the present embodiment; and FIG. 4B shows a detection result by the comparative example.

FIG. 5A is a front view; and FIG. 5B is a side view.

FIG. 6A shows a base configuration composed of a bridge circuit; FIG. 6B shows an example in which fixed resistance Rs of FIG. 6A is changed to variable resistance; and FIG. 6C shows a circuit including variable resistance having a different form from that in FIG. 6B.

DESCRIPTION OF EMBODIMENTS

Figures 2A, 2B:
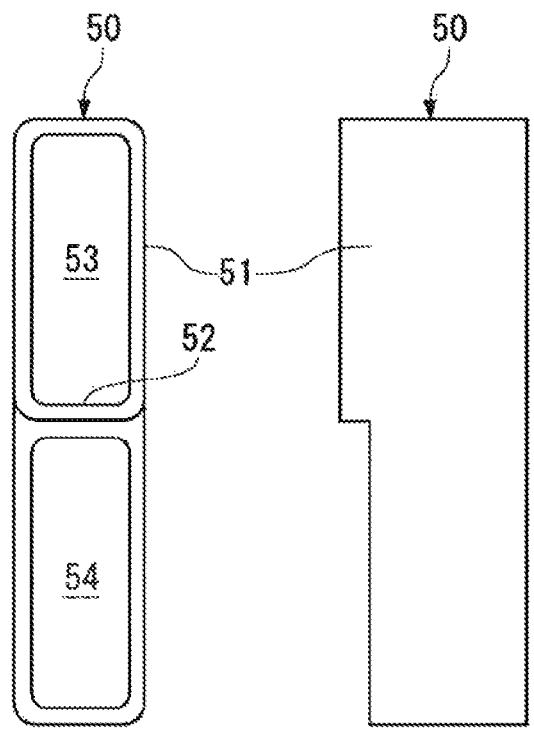
FIGS. 2A and 2B show an infrared absorption form attached to the infrared temperature sensor according to the present embodiment.

In the following, the present invention is described in detail based on an embodiment shown in the accompanying drawings.

As shown in FIGS. 1, an infrared temperature sensor 10 includes a sensor case 20, a sensor cover 30 that is attached to a rear side of the sensor case 20, a film 40 that is held between the sensor case 20 and the sensor cover 30, an infrared detection element 43 that is held on the film 40, a temperature compensation element 45 that is held on the film 40, and an infrared absorption molded body 50 that is fitted within the sensor case 20. In the present embodiment, a side opposing an object to be detected is set as front (front side).

Figure 5A:
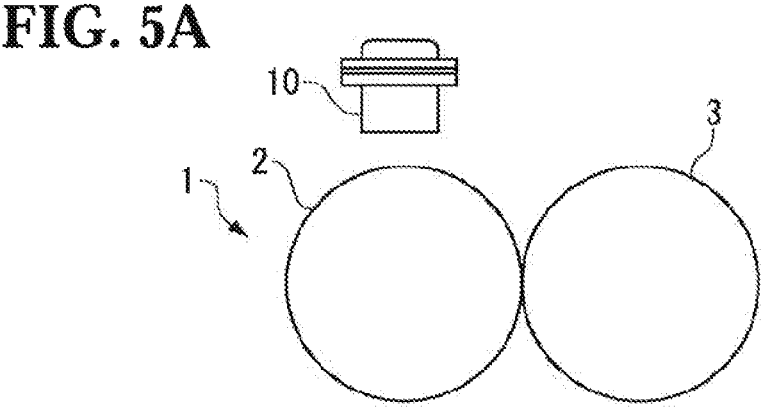
FIGS. 5A and 5B show a schematic configuration of a fixing device according to the present embodiment.
Figure 5B:
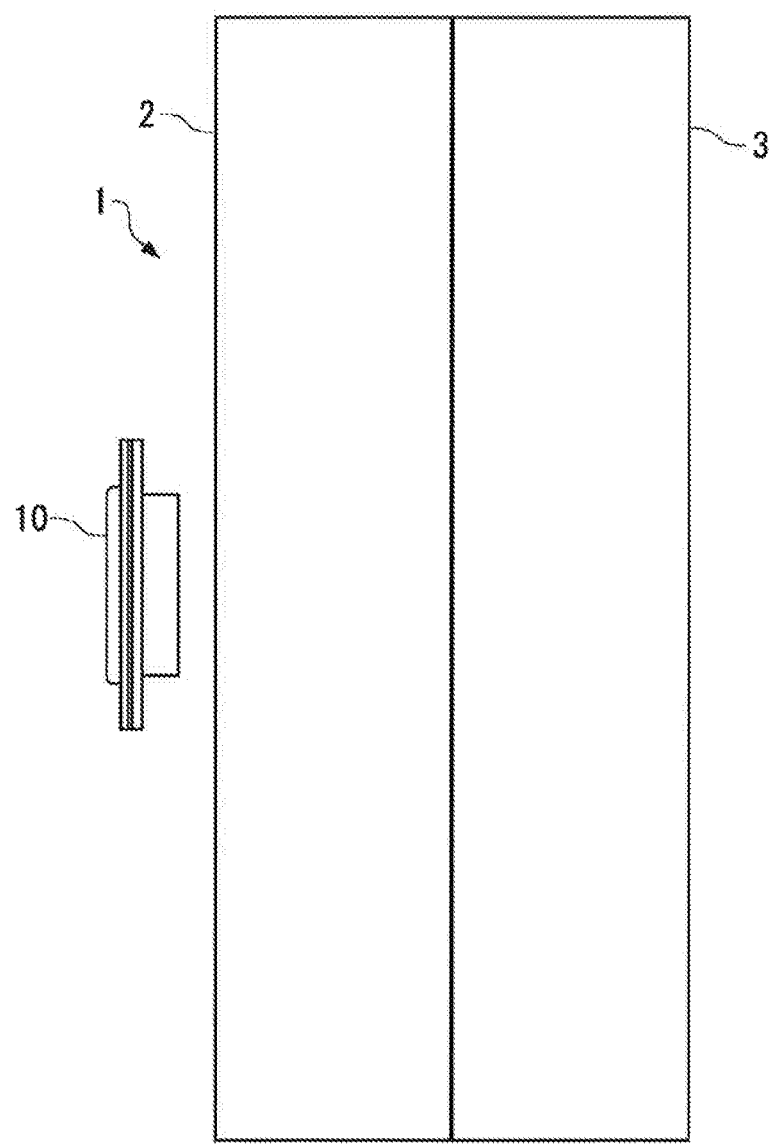

The infrared temperature sensor 10 is a sensor that detects a temperature of a roller 2 as fixing means of a toner fixing device 1 for use in an image forming apparatus such as a copy machine and a printer in a non-contact manner by detecting infrared rays emitted from the roller 2 by the infrared detection element 43, and further detecting an atmosphere temperature by the temperature compensation element 45 to perform temperature compensation as shown in, for example, FIGS. 5A and 5B. The toner fixing device 1 includes the roller 2 as the fixing means, and a roller 3 as pressurizing means.

[Sensor Case 20]

The sensor case 20 includes a base portion 21 having a rectangular planar shape, and a body portion 22 having a rectangular parallelepiped outer shape that projects forward from the base portion 21.

The body portion 22 includes a side wall 23 that rises from the base portion 21, and an upper wall 24 that is provided at a front end of the side wall 23, and an airspace 25 is formed therein. The airspace 25 forms a rectangular parallelepiped shape substantially similar to that of the body portion 22.

The airspace 25 penetrates the sensor case 20 (the base portion 21) on a rear end side. On a front end side, one portion of the airspace 25 penetrates the upper wall 24 via an infrared entrance window 26 that opens in a rectangular shape in the upper wall 24, and a remaining portion is closed by the upper wall 24. The closed portion constitutes a light shielding wall of the present invention. The infrared rays radiated from the roller 2 toward the infrared temperature sensor 10 are introduced from the infrared entrance window 26, pass through the airspace 25 toward the rear end side, and radiated onto the film 40. The infrared rays radiated from the roller 2 toward the infrared temperature sensor 10 are also radiated onto the side wall 23 and the upper wall 24 of the body portion 22 and the base portion 21. The infrared absorption molded body 50 is fitted to the airspace 25.

In the sensor case 20, the base portion 21 and the body portion 22 are integrally formed of metal with high heat conductivity such as aluminum and copper. Although the metal with high heat conductivity is a preferable form, the present invention is not limited thereto.

[Sensor Cover 30]

The sensor cover 30 includes a base portion 31 having a rectangular planar shape, and an element accommodation portion 32 that projects backward from the base portion 31.

The base portion 31 is formed in almost the same shape and almost the same size as those of the base portion 21 of the sensor case 20. The sensor case 20 and the sensor cover 30 are determined in position such that peripheral edges of the base portion 21 and the base portion 31 are matched with each other, and are joined via the film 40.

An accommodation concave portion 33 that opens to a front end side is formed in the element accommodation portion 32. The infrared detection element 43 and the temperature compensation element 45 held on the film 40 are arranged facing the accommodation concave portion 33. The infrared detection element 43 and the temperature compensation element 45 avoid direct contact with a bottom wall 34 of the element accommodation portion 32 due to existence of the accommodation concave portion 33. That is, air included in the accommodation concave portion 33 functions as a heat insulating layer, and heat influences on the infrared detection element 43 and the temperature compensation element 45 from outside, particularly, from behind the infrared temperature sensor 10 are minimized. Although it is a preferable form that the heat insulating layer using air is provided, the present invention does not exclude a form in which the infrared detection element 43 and the temperature compensation element 45 are in direct contact with the sensor cover 30. If the accommodation concave portion 33 communicates with outside, a foreign object may enter from outside to possibly negatively affect characteristics of the infrared detection element 43 and the temperature compensation element 45; therefore, the accommodation concave portion 33 preferably has sealing properties from outside sufficient enough to prevent the entrance of foreign objects.

The sensor cover 30 is integrally formed of metal with high heat conductivity similarly to the sensor case 20. Forming the sensor case 20 and the sensor cover 30 of the metal with high heat conductivity as described above contributes to a uniform temperature change of the entire infrared temperature sensor 10 by following an ambient temperature change.

[Film 40]

The infrared detection element 43 and the temperature compensation element 45 are arranged on one surface of the film 40, and electrically connected to an unillustrated wiring pattern. Although an external leading terminal is formed at an end of the wiring pattern, this configuration is well known among those skilled in the art, and is thus not shown and described here.

The film 40 is formed by resin made of a polymer material. Any material may be used for the resin as long as the material absorbs infrared light, and known resins such as PPS (polyphenylene sulfide), polyimide, polyester, and polyethylene may be used. A material other than resin may be also used as long as the material absorbs infrared light.

The infrared detection element 43 detects a temperature rise by heat generated when the infrared rays emitted from a surface of the roller 2 are absorbed by the film 40, and the temperature compensation element 45 detects the atmosphere temperature. Also, heat sensitive elements having almost equivalent temperature characteristics are used for the infrared detection element 43 and the temperature compensation element 45. The temperatures detected by the respective elements, and the temperature characteristics of the respective elements are described in detail later.

As the infrared detection element 43 and the temperature compensation element 45, a wide variety of small resistors having a temperature coefficient such as a thin-film thermistor and a platinum temperature sensor can be also used, and the infrared detection element 43 and the temperature compensation element 45 are not limited to a specific material and a specific form.

The infrared detection element 43 and the temperature compensation element 45 are arranged at axisymmetrical positions with reference to a longitudinal center of the film 40.

[Infrared Absorption Molded Body 50]

The infrared absorption molded body 50 includes a peripheral wall 51 having a rectangular-parallelepiped outer shape and forming an outer periphery as shown in FIGS. 2A and 2B.

The infrared absorption molded body 50 also includes a first airspace 53 and a second airspace 54 that are surrounded by the peripheral wall 51, and partitioned by a partition wall 52. The first airspace 53 and the second airspace 54 penetrate in a height direction (a front-rear direction when the infrared absorption molded body 50 is arranged within the body portion 22), and have substantially symmetrical forms with reference to the partition wall 52. In the peripheral wall 51, a portion corresponding to the first airspace 53 projects forward relative to a portion corresponding to the second airspace 54.

The infrared absorption molded body 50 having the aforementioned configuration is fitted within the body portion 22 of the sensor case 20. The first airspace 53 of the infrared absorption molded body 50 is arranged on a side of a region within the airspace 25 of the body portion 22 that penetrates the upper wall 24 via the infrared entrance window 26, and the second airspace 54 thereof is arranged on a side within the airspace 25 of the body portion 22 that is closed by the upper wall 24. With reference to the infrared detection element 43 and the temperature compensation element 45, the first airspace 53 is arranged on aside corresponding to the infrared detection element 43, and the second airspace is arranged on a side corresponding to the temperature compensation element 45.

In the infrared absorption molded body 50 arranged as described above, the first airspace 53 constitutes a light guiding region in which the infrared rays entering from the infrared entrance window 26 pass until reaching the film 40. Also, the second airspace 54 constitutes a light shielding region which is surrounded by the peripheral wall 51, the partition wall 52, the upper wall 24, and the film 40 to block radiation of the infrared rays. Since the first airspace 53 and the second airspace 54 have the substantially symmetrical forms as described above, the light guiding region and the light shielding region also have substantially symmetrical forms. When the film 40 is held by the sensor case 20 and the sensor cover 30, the infrared detection element 43 is arranged in substantially the center (in plan view) of the light guiding region (the first airspace 53), and the temperature compensation element 45 is arranged in substantially the center of the light shielding region (the second airspace 54). Therefore, heat influences on the infrared detection element 43 and the temperature compensation element 45 can be made equivalent except for the radiation of the infrared rays from the roller 2. The film 40 on which the infrared detection element 43 and the temperature compensation element 45 are arranged, and the sensor cover 30 are arranged parallel to each other with a predetermined distance therebetween such that the same heat influences of heat conduction, convection, and re-radiation of the infrared rays are obtained.

By arranging the infrared absorption molded body 50 in the body portion 22 of the sensor case 20, the influences of infrared rays reflected from an inner wall surface of the body portion 22, and infrared rays emitted from the heated body portion 22 on the infrared detection element 43 and the temperature compensation element 45 can be avoided or suppressed. This is a basic effect of the infrared absorption molded body 50.

To achieve the object, the infrared absorption molded body 50 is formed of a resin material having high infrared absorptivity such as the aforementioned PPS. The infrared absorption molded body 50 is simply inserted into the airspace 25 after fabricated by, for example, injection molding, and can be thereby fitted to the body portion 22, so that costs of the infrared temperature sensor 10 can be largely reduced as compared to a case in which an infrared absorption film is formed by conventional film formation. In addition, the peripheral wall 51 and the partition wall 52 of the infrared absorption molded body 50 can be formed with high dimensional accuracy as compared to the infrared absorption film by film formation.

Meanwhile, as arrangement of the roller 2 (the object to be detected) and the infrared temperature sensor 10, the infrared temperature sensor 10 is preferably arranged parallel to the roller 2 as shown in FIGS. 5 such that the infrared detection element and the temperature compensation element have the same temperature gradient with respect to the roller 2 as a heat source.

While the object to be detected of the infrared temperature sensor 10 is the roller 2 as the fixing means, the roller 2 has a rectangular shape as viewed from the infrared temperature sensor 10, and it is preferable that the infrared entrance window 26 has an opening shape similar to the roller 2 so as to effectively capture the emitted infrared rays. For example, when an opening dimension L1 in a diameter direction of the roller 2 (FIG. 1A) is 1, an opening dimension L2 in an axial direction of the roller 2 (FIG. 1A) is preferably set to 2 or more. Moreover, when the ratio of the opening dimension L1 of the infrared entrance window 26 and a light guiding length L3 of the light guiding region (FIGS. 1A and 1C) is small, a wide view angle is restricted in the light guiding region, so that infrared rays from the background are also introduced to cause a detection error unless the infrared temperature sensor 10 is mounted adjacent to the roller 2. When the infrared temperature sensor 10 is arranged extremely adjacent to the roller 2, the infrared temperature sensor 10 receives larger heat influences from the roller 2 (the object to be detected), so that it becomes necessary to configure the sensor case 20 and the sensor cover 30 by using a member with a high temperature limit, which causes a cost increase. Thus, the ratio of the opening dimension L1 of the infrared entrance window 26 and the light guiding length L3 is preferably set to 1:1 or more.

In the infrared temperature sensor 10, since the infrared detection element 43 detects the atmosphere temperature (including the sensor case 20 and the sensor cover 30) in addition to the infrared rays emitted from the roller 2 (the object to be detected), and the temperature compensation element 45 detects the atmosphere temperature, ideal heat influences on the respective elements are as follows.

Infrared detection element ("direct radiation"+"heat conduction"+"convection"+"re-radiation")−Temperature compensation element ("heat conduction"+"convection"+"re-radiation")

At this point, an influence difference between the infrared detection element 43 and the temperature compensation element 45 among the heat influences from the object to be detected is only "direct radiation" of the infrared rays, so that the infrared rays emitted from the object to be detected can be accurately detected. This is based on a premise that the heat influences of "heat conduction"+"convection"+"re-radiation" on the infrared detection element 43 and the heat influences of "heat conduction"+"convection"+"re-radiation" on the temperature compensation element 45 are the same. To obtain the same heat influences on the infrared detection element 43 and the temperature compensation element 45, the light guiding region and the light shielding region have the substantially symmetrical forms in the present embodiment.

Since the sensor case 20 and the sensor cover 30 are formed of a member having high heat conductivity such as metal, the infrared temperature sensor 10 is equally heated. Also, the light guiding region leading to the infrared detection element 43 and the surrounding light shielding region leading to the temperature compensation element 45 have the substantially symmetrical forms, and the infrared absorption molded body 50 having high infrared absorptivity partitions the light guiding region and the light shielding region. Accordingly, "heat conduction"+"convection"+"re-radiation" from the roller 2 are equally received by the entire infrared temperature sensor 10, and only the infrared detection element 43 receives the influence of "direction radiation", so that the infrared rays emitted from the roller 2 are accurately detected.

[Comparative Test]

A result of a test performed by the present inventors so as to confirm the effect is described below.

Figure 3A:
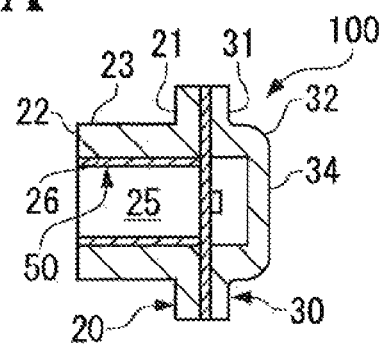
FIGS. 3A and 3B are views illustrating an infrared temperature sensor (a comparative example) used in a comparative experiment.
Figure 3B:
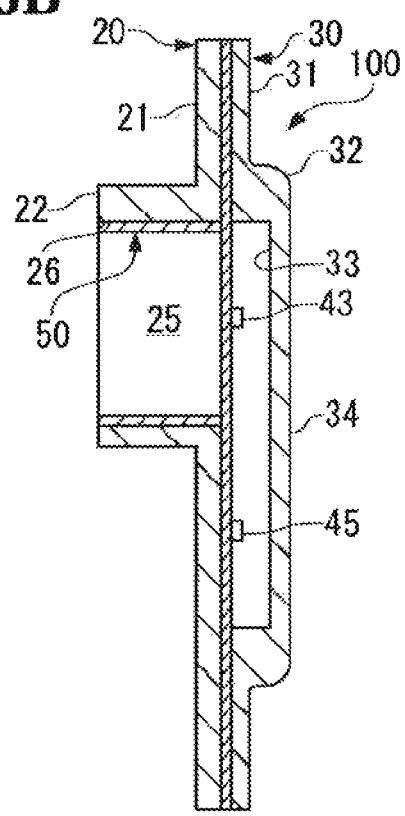

In the test, the infrared temperature sensor 10 shown in FIGS. 1A to 1C and a comparative sensor 100 shown in FIGS. 3A and 3B were used. The comparative sensor 100 has the same configuration as the infrared temperature sensor 10 except that the comparative sensor 100 does not have a portion corresponding to the light shielding region.

By using the infrared temperature sensor 10 and the comparative sensor 100 described above, the influence of "direct radiation" from the object to be detected on the infrared detection element 43 was made zero by closing the infrared entrance window 26, and the temperature of the heated object to be detected was detected. Accordingly, the infrared detection element 43 and the temperature compensation element 45 were caused to receive only the influences of "heat conduction", "convection", and "re-radiation" from the sensor case 20 and the sensor cover 30 (excluding the influence of radiation on the sensor case 20 and the sensor cover 30 themselves).

Figure 4A:
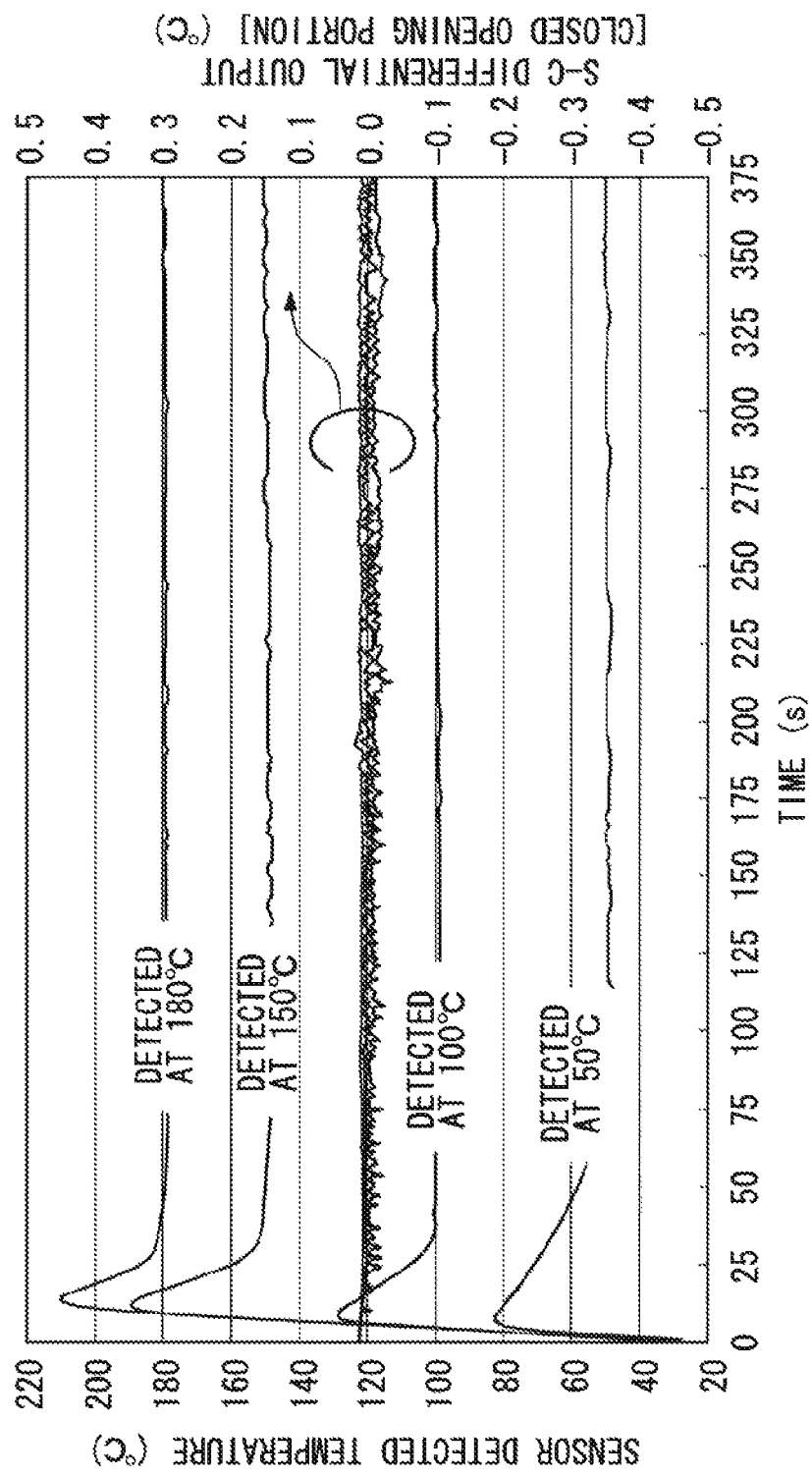

The result is shown in FIGS. 4A and 4B. FIGS. 4A and 4B show a value (S-C) obtained by subtracting a temperature T2 detected by the temperature compensation element 45 from a temperature T1 detected by the infrared detection element 43 in addition to a detected temperature T of the object to be detected.

Here, the influences of "heat conduction", "convection" and "re-radiation" on the infrared detection element 43 and the temperature compensation element 45 are the same when the detected temperature T1 and the detected temperature T2 are equal to each other even when the atmosphere temperature of the non-contact sensor (the infrared temperature sensor 10 and the comparative sensor 100) is changed along with a change in the temperature of the object to be detected. Conversely, when the detected temperature T1 and the detected temperature T2 differ from each other, the influences of "heat conduction", "convection", and "re-radiation" other than "direct radiation" on the infrared detection element 43 and the temperature compensation element 45 are different. In this case, the "direct radiation" itself cannot be accurately detected.

By referring to FIG. 4A with regard to the infrared temperature sensor 10, the differences in the detected temperature (S-C) between the infrared detection element 43 and the temperature compensation element 45 correspond at respective detected temperatures (50° C., 100° C., 150° C., and 180° C.). Therefore, the test result shows that the influences of "heat conduction", "convection", and "re-radiation" other than "direct radiation" are equivalent between the infrared detection element 43 and the temperature compensation element 45. This suggests that the "direct radiation" by the infrared rays emitted from the object to be detected can be accurately detected by using the infrared temperature sensor 10 in which the infrared entrance window 26 is not closed.

Meanwhile, in the comparative sensor 100, the temperature compensation element 45 has a higher detected temperature than the infrared detection element 43 at the respective detected temperatures (50° C., 100° C., 150° C., and 180° C.) as shown in FIG. 4B. This is because a back surface of the film 40 on which the temperature compensation element 45 is arranged is in contact with the base portion 21 of the sensor case 20 having high heat conductivity in the comparative sensor 100. The differences in the detected temperature (S-C) between the infrared detection element 43 and the temperature compensation element 45 largely differ at the respective detected temperatures. As described above, in the comparative sensor 100, the influences of "heat conduction", "convection", and "re-radiation" other than "direct radiation" differ between the infrared detection element 43 and the temperature compensation element 45.

The difference in the detected temperature (S-C) between the infrared detection element 43 and the temperature compensation element 45 appears as an error in detecting the "direct radiation". The error can be corrected by acquiring the differences in the detected temperature between the infrared detection element 43 and the temperature compensation element 45 at the respective detected temperatures in advance. However, although the correction is relatively easy when the detected temperature is stable, the correction is not easily performed in a region in which the detected temperature largely varies as in an initial stage of detection, and it is difficult to accurately detect the "direct radiation".

[Detection Circuit]

Next, a basic configuration of a detection circuit using the infrared temperature sensor 10 is described by reference to FIGS. 6A to 6C.

Figure 6A:
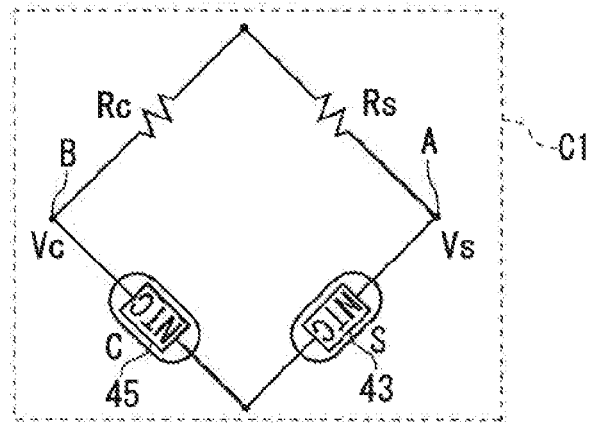
FIGS. 6A to 6C show a configuration of a temperature detection circuit using the infrared temperature sensor according to the present embodiment.

A detection circuit C1 shown in FIG. 6A constitutes a bridge circuit in which the infrared detection element 43 and the temperature compensation element 45 are connected in series and fixed resistance Rs (first resistance) and fixed resistance Rc (second resistance) are connected in series.

In the detection circuit C1, when the infrared rays emitted from the surface of the roller 2 reach the film 40 through the light guiding region, the infrared rays are absorbed by the film 40 and energy of the infrared rays is converted to heat, which is transmitted to the infrared detection element 43 to increase the temperature of the infrared detection element 43. When a resistance value of the infrared detection element 43 is changed by the radiation of the infrared rays, a potential Vs (a first middle point voltage) of a connection point A is changed. At the same time, a potential Vc (a second middle point voltage) of a connection point B is changed when a resistance value of the temperature compensation element 45 is subjected to a resistance value change corresponding to the temperature increase. When the infrared detection element 43 and the temperature compensation element 45 have equivalent temperature characteristics and the fixed resistance Rs and the fixed resistance Rc are equal to each other, a difference between the potential Vs of the connection point A and the potential Vc of the connection point B indicates only a temperature change by the infrared rays from the roller 2 (the object to be detected).

The detection accuracy of the detection circuit C1 using the bridge circuit largely depends on pairing accuracy between the infrared detection element 43 and the temperature compensation element 45 in the detection circuit C1, that is, a difference between the characteristics of the infrared detection element 43 and the temperature compensation element 45, or pairing accuracy between the fixed resistance Rs and the fixed resistance Rc. Therefore, normally, it is necessary to select and use the detection elements and the fixed resistance with high pairing accuracy. However, use of the detection elements and the fixed resistance with high pairing accuracy increases costs. Furthermore, even when the detection elements and the fixed resistance with high pairing accuracy are used to constitute the detection circuit C1, a detection error may be caused if there is a variation in the pairing accuracy.

It is assumed that a temperature T3 of the roller 2, the temperature T1 of the infrared detection element 43, and the temperature T2 of the temperature compensation element 45 correspond to each other (T1=T2=T3) when the temperatures are detected in the detection circuit C1. Moreover, when the characteristics of the infrared detection element 43 and the temperature compensation element 45 correspond to each other and the characteristics of the fixed resistance Rs and the fixed resistance Rc correspond to each other, the voltage Vs and the voltage Vc correspond to each other. At this time, the pairing error is zero, and an error of the sensor detected temperature caused by the pairing error is also considered to be zero. Incidentally, the condition of T1=T2=T3 can be easily created as a state in which the roller 2 is not heated, that is, in a state before the operation of an apparatus such as a printer is started.

If the voltage Vs and the voltage Vc are not equal to each other under the above condition (T1=T2=T3), the characteristics of the infrared detection element 43 and the temperature compensation element 45 are different (there is a pairing error), or there is a pairing error between the fixed resistance Rs and the fixed resistance Rc.

Even if there is a pairing error between the infrared detection element 43 and the temperature compensation element 45 or a pairing error between the fixed resistance Rs and the fixed resistance Rc, product costs can be lowered by resolving a detection error. FIG. 6B shows a detection circuit C2 which can cancel, i.e., correct the two pairing errors.

In the detection circuit C2 variable resistance is used as the resistance Rs corresponding to the infrared detection element 43. If there is a pairing error between the infrared detection element 43 and the temperature compensation element 45, the voltage Vs is not equal to the voltage Vc even when the resistance Rs is equal to the resistance Rc; however, since the resistance Rs is variable, the potential Vs can be adjusted. Thus, even if there is a pairing error between the infrared detection element 43 and the temperature compensation element 45 under the condition of T1=T2=T3, the voltage Vs can be made equal to the voltage Vc, so that the pairing error can be corrected.

Although a variable resistance is used as the resistance Rs corresponding to the infrared detection element 43 in the detection circuit C2, the present invention is not limited thereto, and the variable resistance may be also used as the resistance Rc corresponding to the temperature compensation element 45. However, it is more preferable to use the variable resistance as the resistance Rs than the resistance Rc.

Figure 6B:
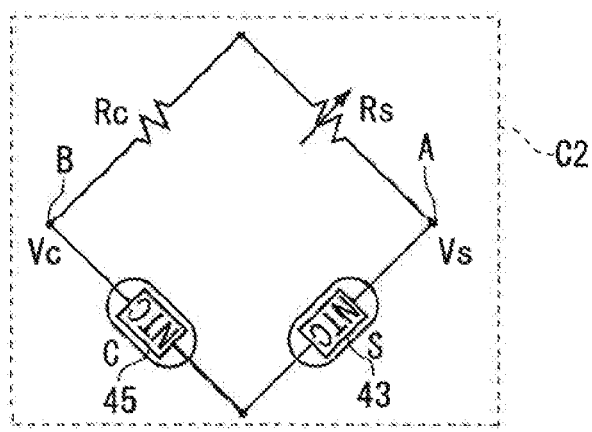
Figure 6C:
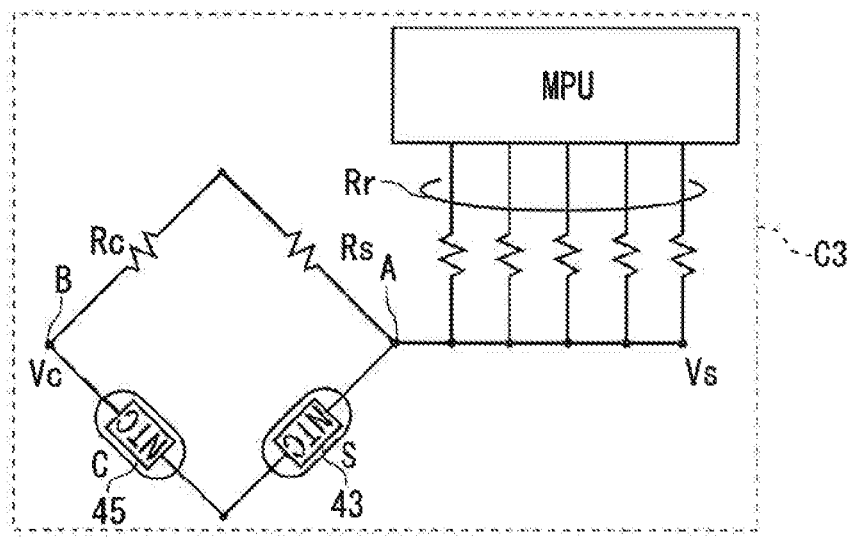

Although the variable resistance is used as the resistance Rs in FIG. 6B, the resistance Rs may be fixed resistance and ladder resistance Rr may be added to adjust a resistance value corresponding to the infrared detection element 43 as in a detection circuit C3 shown in FIG. 6C.

[Amplification of Operating Output Voltage]

By the way, in the detection circuit C1 or the like using the bridge circuit, a differential output voltage between Vs and Vc may be amplified by an amplifier positioned downstream thereof. At this point, an offset voltage of the amplifier may cause a temperature detection error; however, the offset voltage of the amplifier can be also corrected by performing adjustment with using the variable resistance for the resistance Rs as described above.

Figure 7:
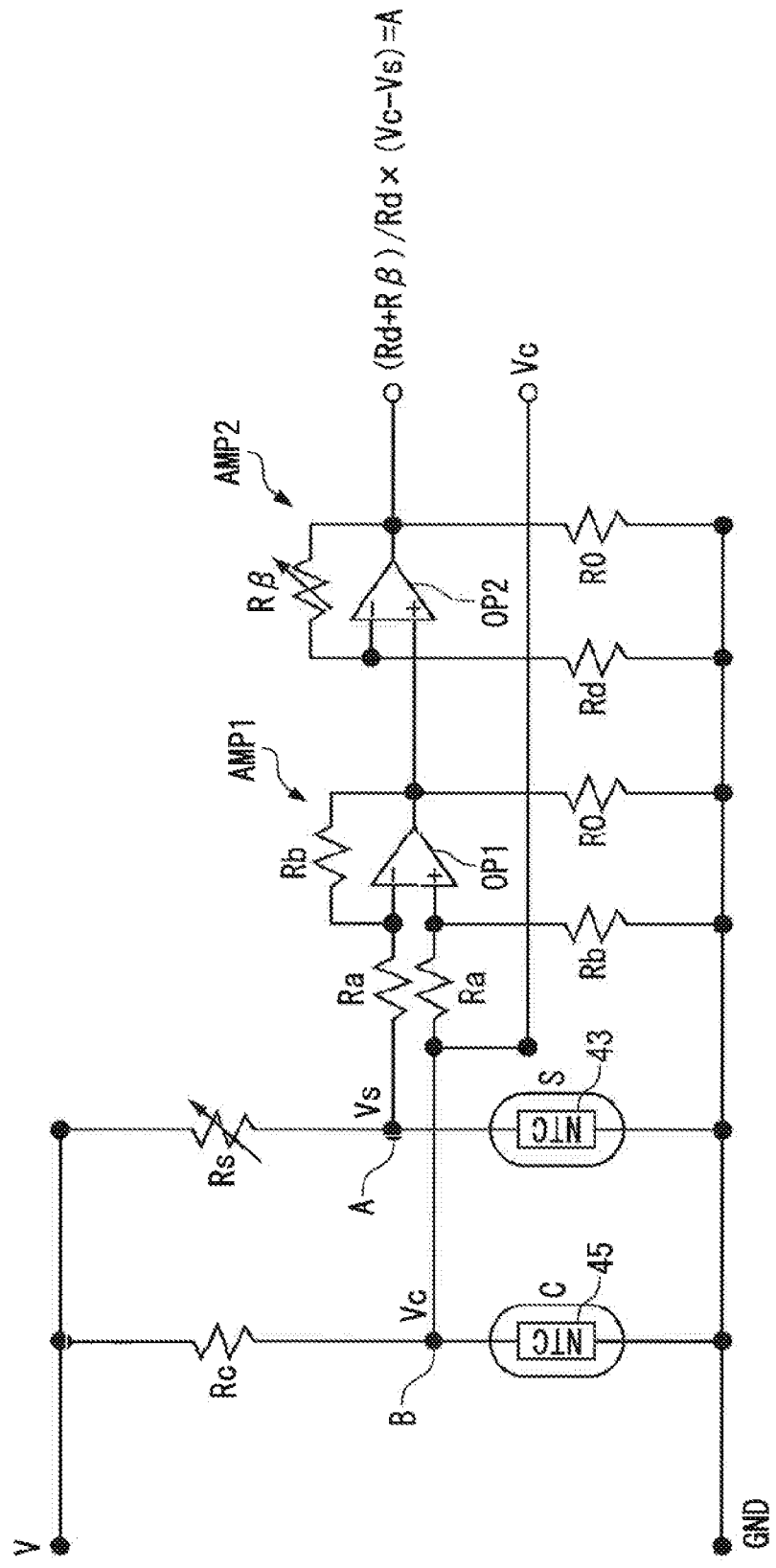
FIG. 7 is a view illustrating one example of a circuit that amplifies a differential output voltage.

One example of a circuit that amplifies the differential output voltage is shown in FIG. 7.

In FIG. 7, the infrared detection element 43 and the variable resistance Rs are connected in series between a power terminal V and a ground GND, and the temperature compensation element 45 and the fixed resistance Rc are connected in series between the power terminal V and the ground GND, to thereby constitute a bridge circuit. That is, one ends of the infrared detection element 43 and the temperature compensation element 45 constituting the infrared temperature sensor 10 are respectively connected to one ends of the variable resistance Rs and the fixed resistance Rc. The other ends of the fixed resistance Rc and the variable resistance Rs are connected to the power terminal V. The other ends of the infrared detection element 43 and the temperature compensation element 45 are connected to the ground GND. A connection point A between the variable resistance Rs and the infrared detection element 43 is connected to a inverting input terminal of the operational amplifier OP1 via input resistance Ra, and a connection point B between the fixed resistance Rc and the temperature compensation element 45 is connected to a non-inverting input terminal of an operational amplifier OP1 via input resistance Ra. Also, feedback resistance Rb is connected between the inverting input terminal and an output terminal of the operational amplifier OP1, and resistance Rb is connected between the non-inverting input terminal of the operational amplifier OP1 and the ground GND. The output terminal of the operational amplifier OP1 is also connected to the ground GND via resistance Ro. The operational amplifier OP1, and the resistance Ra, Rb, and Ro constitute a differential amplification circuit AMP1.

An output of the differential amplification circuit AMP1 is input to a non-inverting input terminal of an operational amplifier OP2. An inverting input terminal of the operational amplifier OP2 is grounded to the ground GND via resistance Rd, and connected to an output terminal via feedback resistance Rβ. A volume (an amplification factor) of the feedback resistance Rβ can be adjusted. Also, the output terminal is connected to the ground GND via resistance Ro. The operational amplifier OP2, and the resistance Rd, Rβ, and Ro constitute a non-inverting amplification circuit AMP2.

The operation of the infrared temperature sensor 10 is described by reference to the circuit in FIG. 7.

The infrared rays emitted from the surface of the object to be detected (the roller 2) enter from the infrared entrance window 26, pass through the light guiding region, and reach the film 40. The infrared rays are absorbed by the film 40, and converted to heat energy. The converted heat is transmitted to the infrared detection element 43 to increase the temperature of the infrared detection element 43. The infrared detection element 43 and the temperature compensation element 45 are composed of, for example, thin-film thermistors having temperature characteristics, and when the resistance value of the infrared detection element 43 is changed by the infrared rays from the object to be detected, the potential of the connection point A is changed from 0 to a predetermined level. At the same time, the temperatures of the sensor case 20 and the sensor cover 30 are also increased by radiation heat from the object to be detected M and the ambient atmosphere temperature, so that the resistance value of the temperature compensation element 45 is also subjected to a resistance value change corresponding to the temperature increase. However, since the light guiding region and the light shielding region have substantially the symmetrical forms, i.e., substantially the same forms, the infrared detection element 43 and the temperature compensation element 45 are changed similarly against an external temperature change except for the direct radiation of the infrared rays. Therefore, the external change can be disregarded, and only the temperature change by the infrared rays from the object to be detected can be detected. A voltage difference between the connection point A and the connection point B corresponding to the temperature change is amplified by the differential amplification circuit AMP1, further amplified by the non-inverting amplification circuit AMP2 downstream thereof, and output.

[Correction of Pairing Error]

Next, an example in which the pairing error is corrected by adjusting the variable resistance Rs, and an example in which the pairing error is corrected by using the expression (1) are described.

Figure 8A:
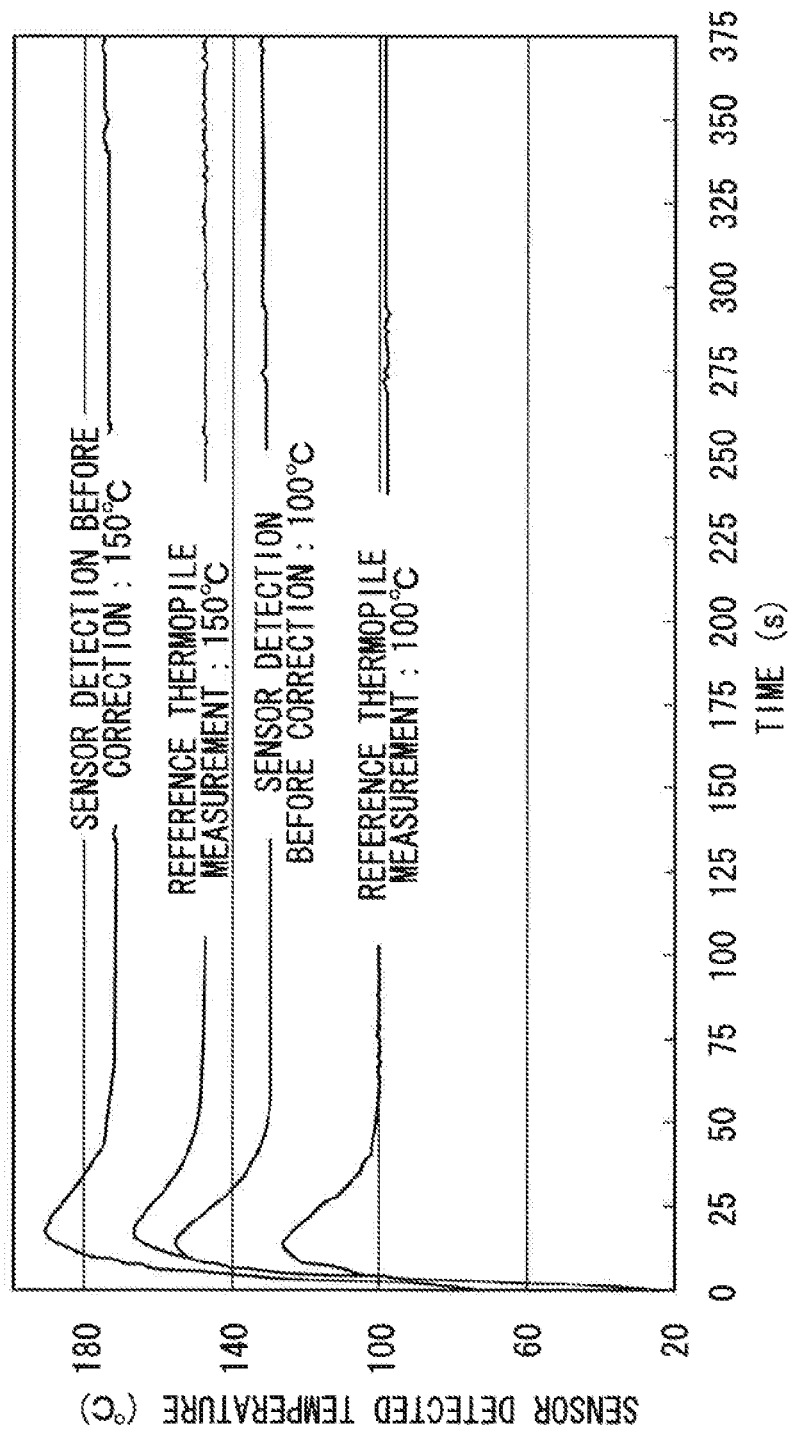
FIG. 8A is a graph that shows a result obtained when temperature detection is performed without correcting a pairing error (resistance Rs=resistance Rc) by using a detection circuit in FIG. 6B.
Figure 8B:
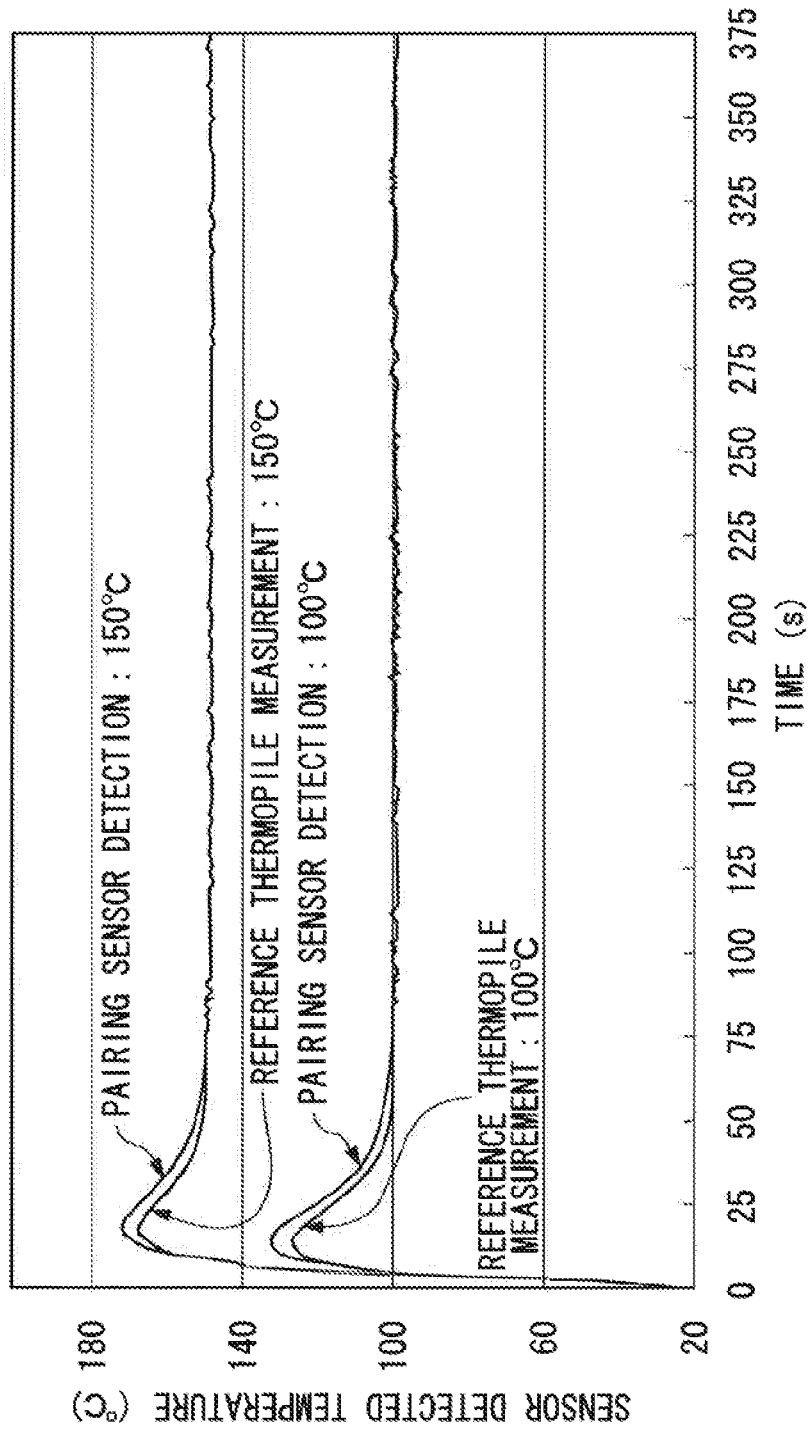
FIG. 8B is a graph that shows a result obtained when temperature detection is performed by using a detection circuit C1 in which an infrared detection element and a temperature compensation element, and fixed resistance Rs and fixed resistance Rc are respectively paired with high accuracy.

FIG. 8A shows a result obtained when the temperature detection is performed without performing the correction (the resistance Rs=the resistance Rc) by using the detection circuit C2, and FIG. 8B shows a result obtained when the temperature detection is performed by using the detection circuit C1 in which the infrared detection element 43 and the temperature compensation element 45, and the fixed resistance Rs and the fixed resistance Rc are respectively paired with high accuracy.

Figure 9:
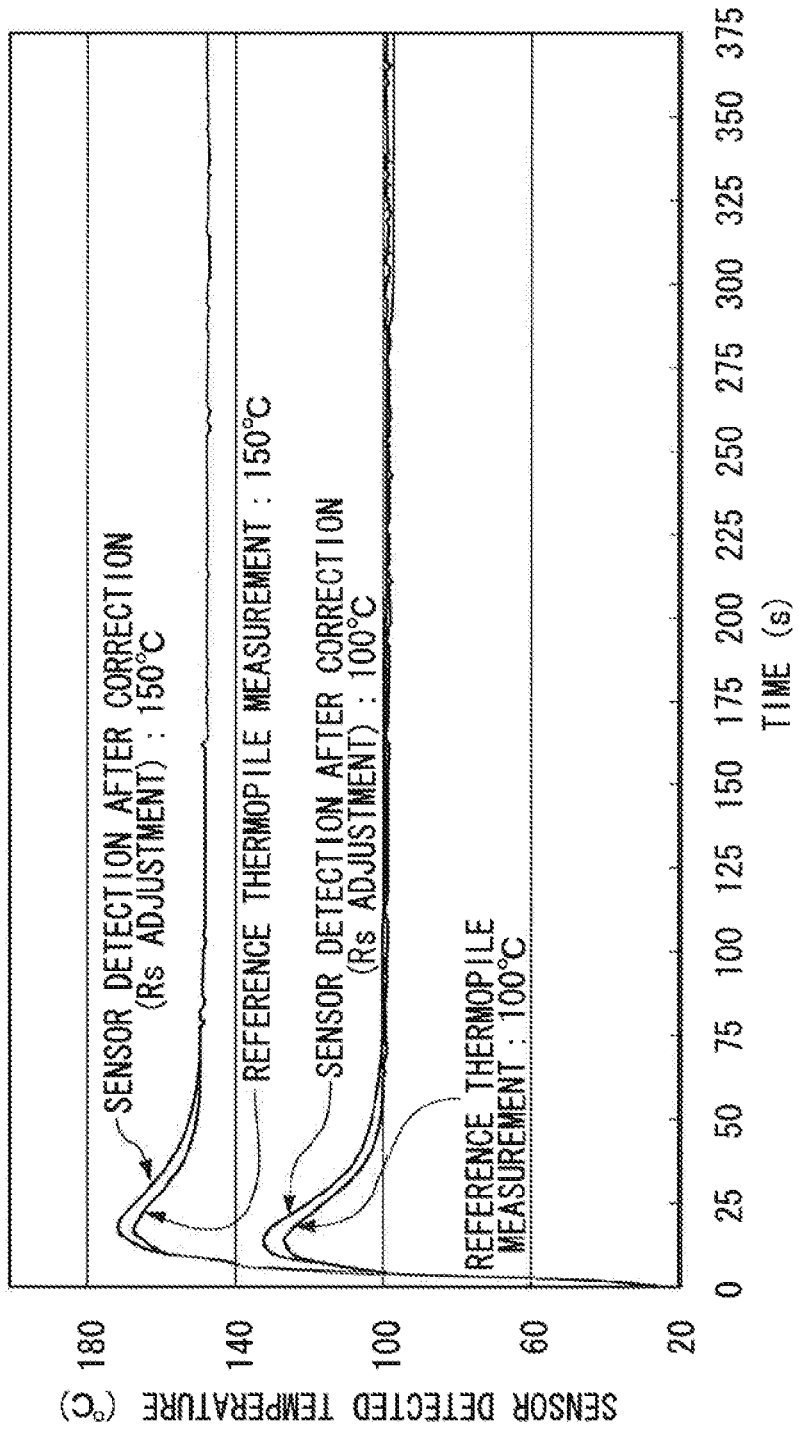
FIG. 9 is a graph that shows a result obtained when temperature detection is performed by correcting a pairing error (adjusting the resistance Rs) by using the detection circuit in FIG. 6B.

FIG. 9 shows a result obtained when the temperature detection is performed by performing the correction (adjusting the variable resistance Rs) by using the detection circuit C2.

Based on FIGS. 8 and 9, it is found that temperature detection accuracy equivalent to that when the elements paired with high accuracy are used is obtained by adjusting the variable resistance Rs to correct the pairing error.

In the following, a procedure for correcting the pairing error is described.

[Correction Using Variable Resistance]

In the detection circuit C2 shown in FIG. 6B, there is a pairing error between the infrared detection element 43 and the temperature compensation element 45, but the amount of error is unknown.

Figure 10:
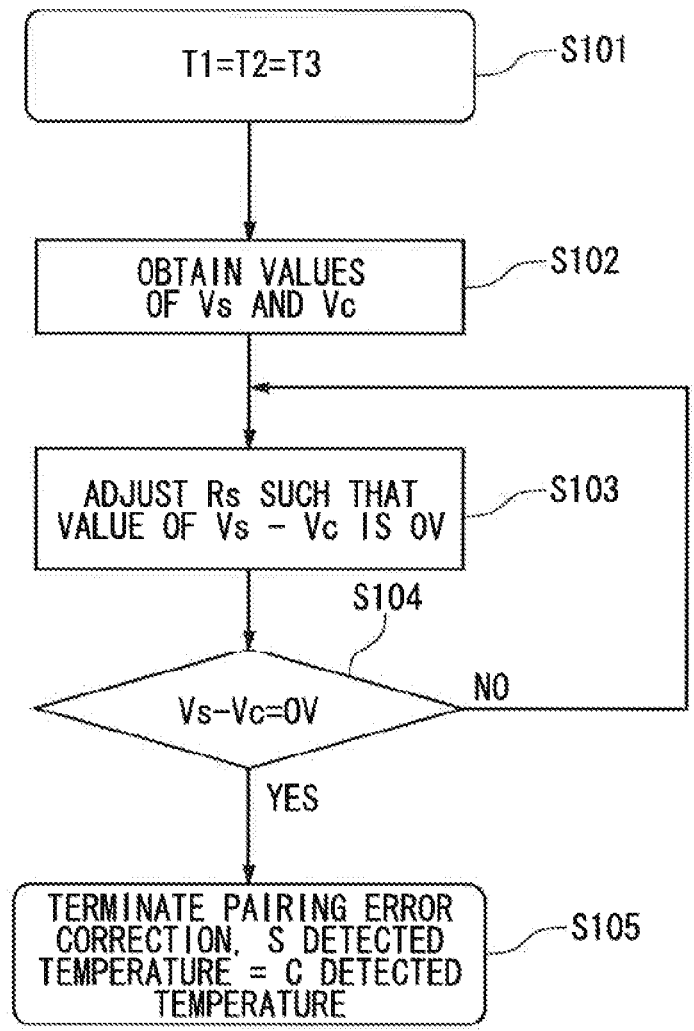
FIG. 10 is a flowchart illustrating a procedure for correcting a pairing error between an infrared detection element and a temperature compensation element.

The voltage Vs and the voltage Vc are obtained (FIG. 10, S102) under the condition of T1=T2=T3 (FIG. 10, S101). The variable resistance Rs is adjusted such that a difference between the voltage Vs and the voltage Vc becomes 0 (Vs−Vc=0) (FIG. 10, S103). When the difference between the voltage Vs and the voltage Vc is 0 (FIG. 10, S104, Yes), the correction of the pairing error is terminated (FIG. 10, S105).

[Correction in Differential Amplification Circuit, Adjustment of Rβ]

Next, correction in the detection circuit shown in FIG. 7 is described. The correction is performed using the Rβ resistance (the volume), in which the amplification factor can be adjusted.

Figure 11:
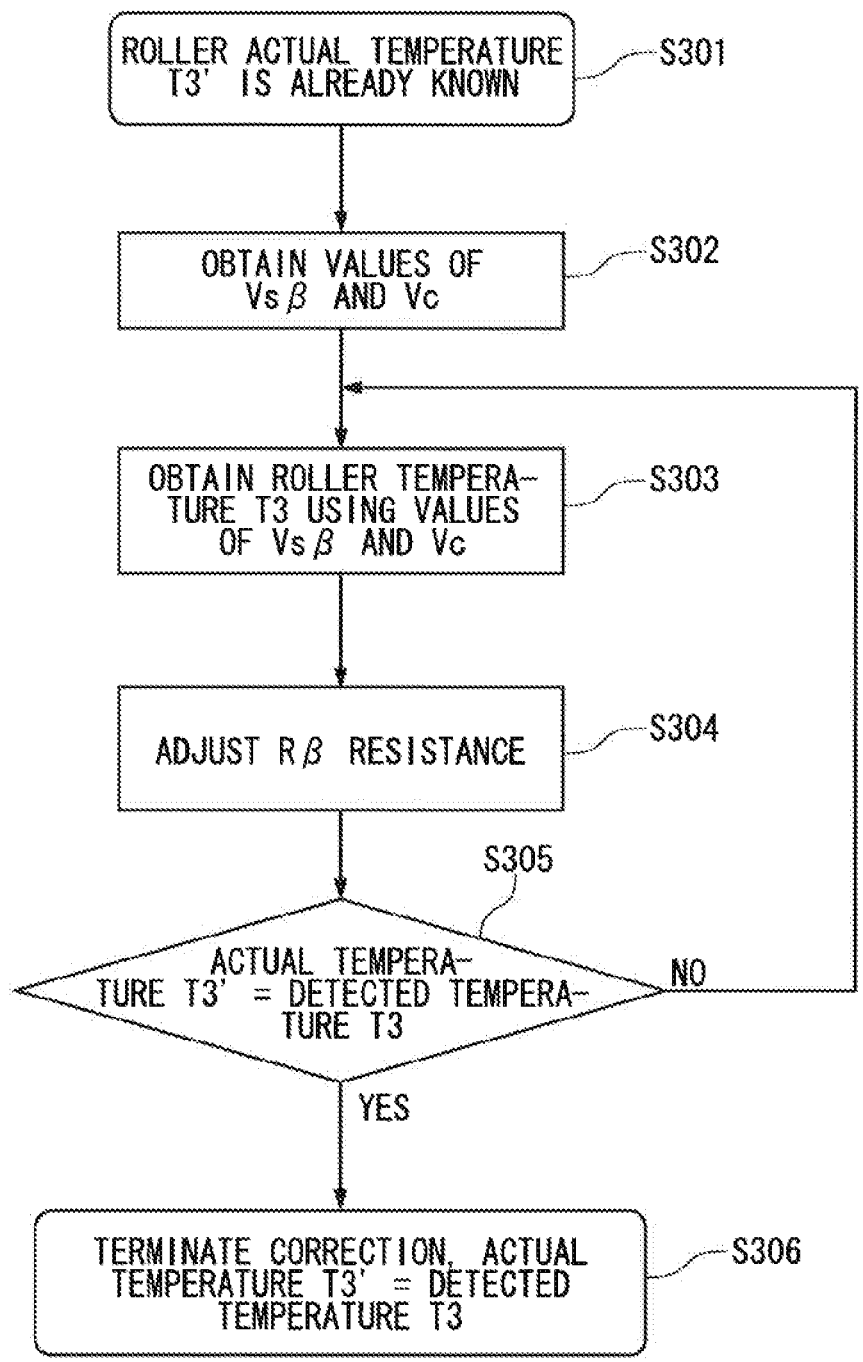
FIG. 11 is a flowchart illustrating a procedure for correcting an offset voltage of a differential amplification circuit by adjusting a volume Rβ.

In the correction, a temperature T3' of the roller 2 is already known by measurement (FIG. 11, S301).

The values of Vsβ and Vc are obtained (FIG. 11, S302), and the temperature T3 of the roller 2 is further measured by using the Vsβ and Vc (FIG. 11, S303). Subsequently, the volume Rβ is adjusted such that the temperature T3 of the roller 2 corresponds to the already-known temperature T3' by using the Vsβ and Vc (FIG. 11, S303, S304). When the adjustment of the Rβ resistance (the volume) is completed, that is, when the temperature T3'=the temperature T3, the correction is terminated (FIG. 11, S305, S306).

The above correcting method can be used instead of, for example, a conventional method for output adjustment by adjusting an opening area of the infrared entrance window 26 by a mechanical element such as a screw. Also, since the infrared temperature sensor 10 for the toner fixing device 1 is placed in an environment in which dust such as toner and paper powder scatters therearound, the dust adheres to the film around the infrared detection element 43 and the temperature compensation element 45 to possibly change the detected temperature over time. With regard to characteristics changes over time, the detected temperature can be adjusted by using the present correcting method to cancel the change over time.

An example in which the present correction is verified is described.

Figure 12A:
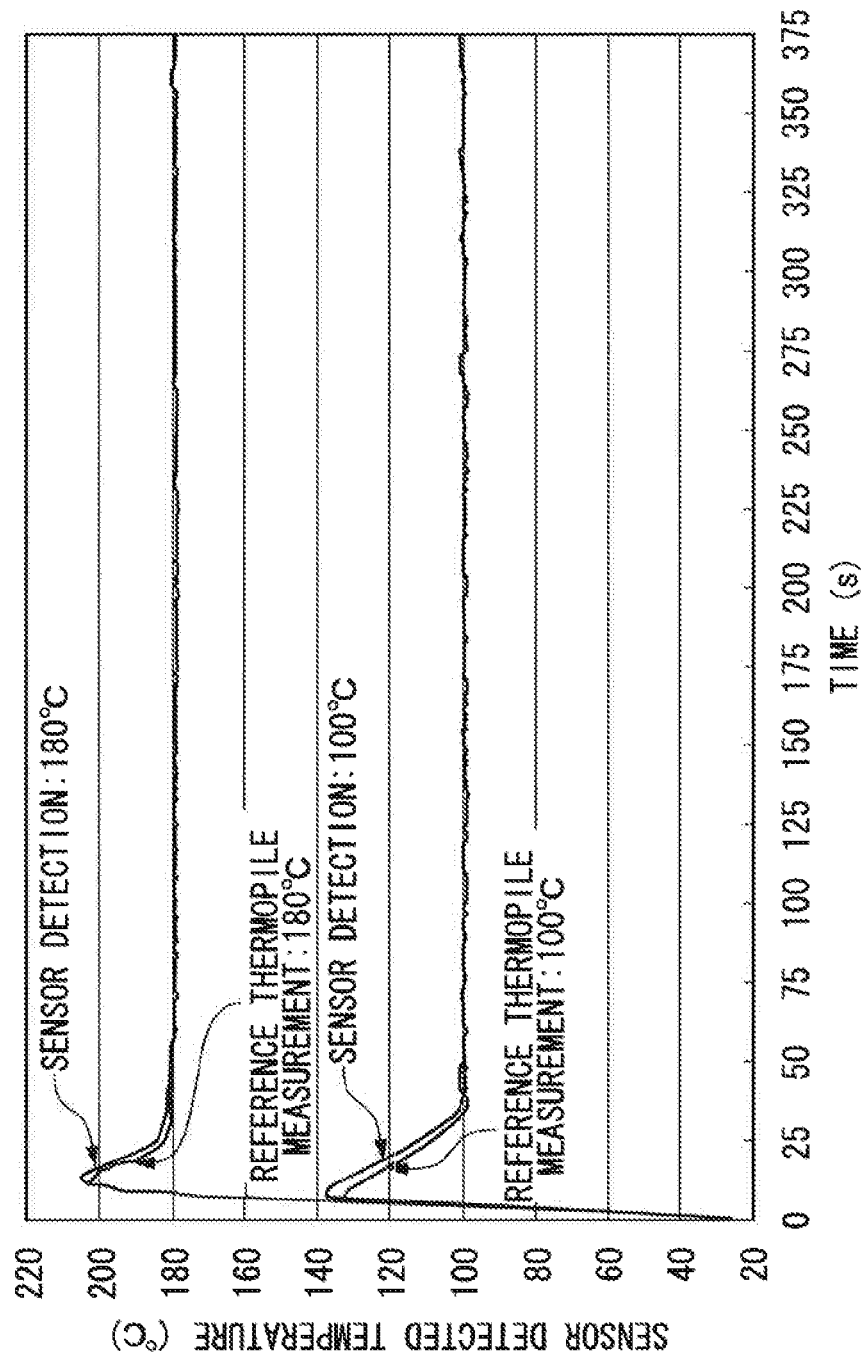
FIG. 12A is a graph that shows reference detected temperature characteristics.

FIG. 12A shows reference detected temperature characteristics. In the example, an actual temperature of the roller 2 and a detected temperature of the infrared temperature sensor 10 are equal to each other.

Figure 12B:
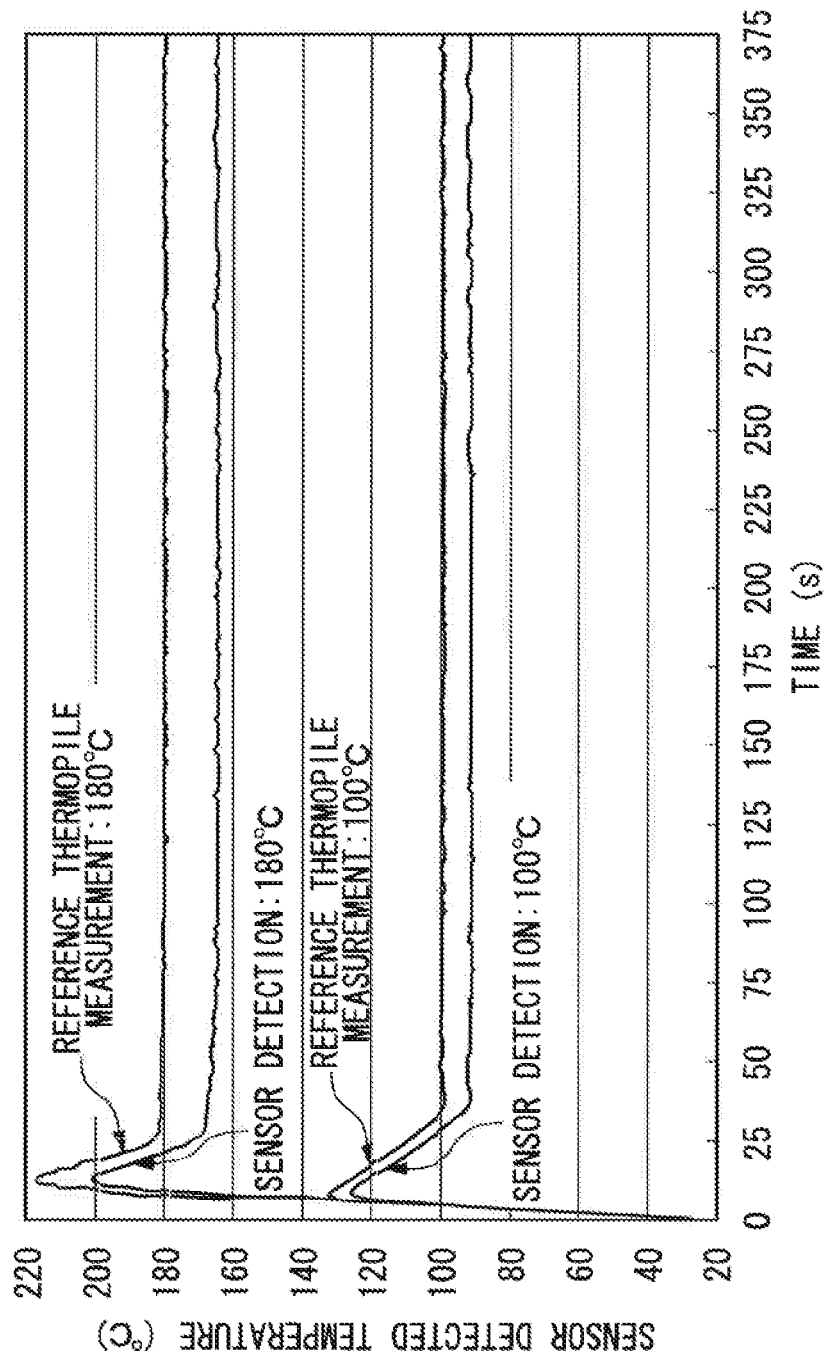
FIG. 12B is a graph that shows temperature characteristics detected by simulatively generating an offset voltage.

Temperature characteristics detected by blocking 20% of the opening area of the infrared entrance window 26 of the infrared temperature sensor 10 are shown in FIG. 12B. Since the influence of the direct radiation of the infrared rays on the infrared detection element 43 is reduced, the detected temperature is lower than the actual temperature of the roller 2 as compared to FIG. 12A.

Figure 13:
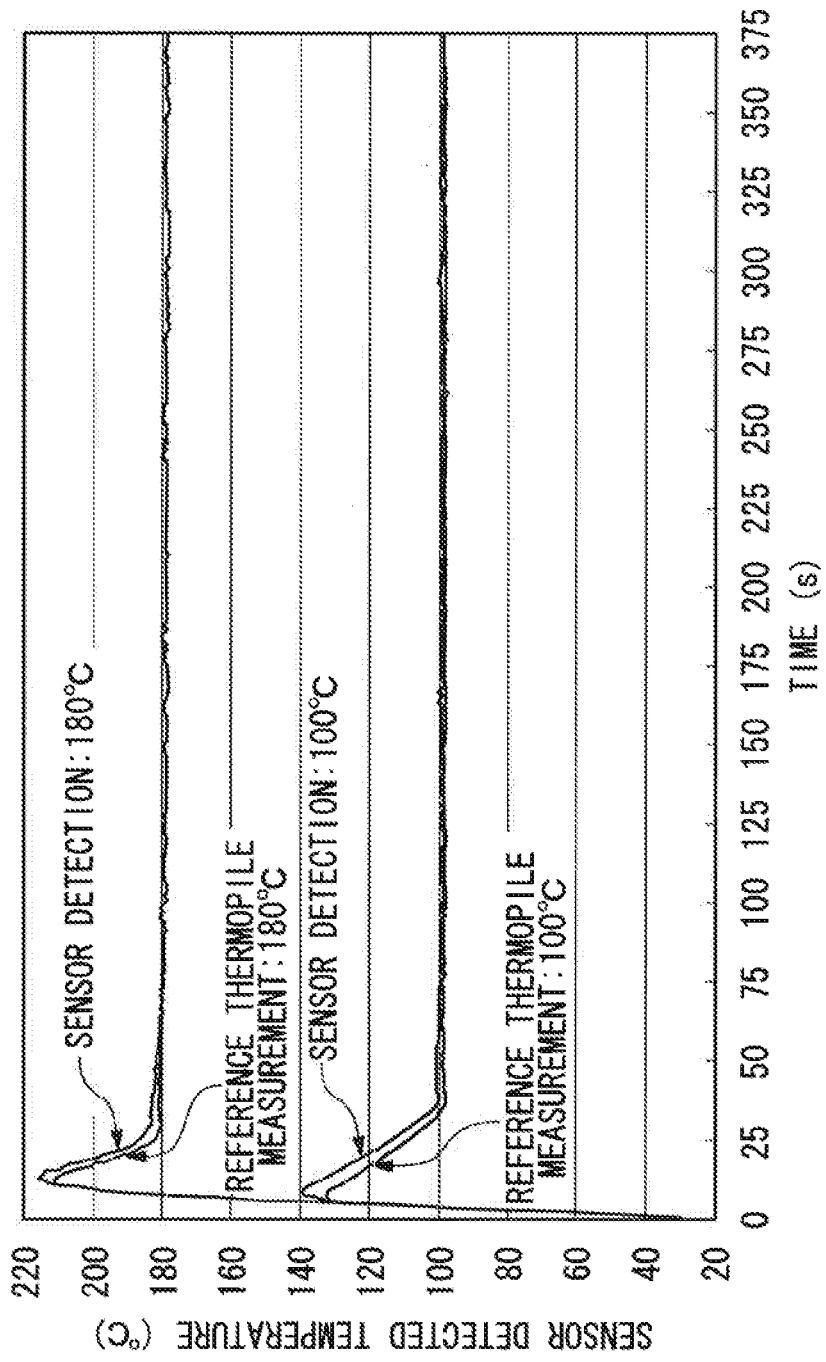
FIG. 13 is a graph illustrating temperature characteristics detected by correcting the offset voltage of the differential amplification circuit by adjusting the volume Rβ.

Temperature characteristics detected after adjusting the Rβ resistance from the above state are shown in FIG. 13. It has been confirmed that the same characteristics as those in FIG. 12A as the reference characteristics are obtained.

Although the present invention has been described based on the embodiment, the constitutions described in the embodiment described above may be also freely selected or changed into other constitutions without departing from the scope of the present invention.

REFERENCE SIGNS LIST

1 Toner fixing device
2, 3 Roller
10 Infrared temperature sensor
20 Sensor case
21 Base portion
22 Body portion
23 Side wall
24 Upper wall
25 Airspace
26 Infrared entrance window
30 Sensor cover
31 Base portion
32 Element accommodation portion
33 Accommodation concave portion
34 Bottom wall
40 Film
43 Infrared detection element
45 Temperature compensation element
50 Infrared absorption molded body
51 Peripheral wall
52 Partition wall
53 First airspace
54 Second airspace
AMP1 Differential amplification circuit
AMP2 Non-inverting amplification circuit
C1, C2, C3 Detection circuit
OP1, OP2 Operational amplifier

The invention claimed is:

1. An infrared temperature sensor which detects a temperature of an object in a non-contact manner, the sensor comprising:
a sensor case made of metal, the sensor case including a light guiding region that guides infrared rays entering from an entrance window, a light shielding region that is adjacent to the light guiding region via a partition wall, an airspace corresponding to the light guiding region and the light shielding region, and where a shielding wall that blocks entrance of the infrared rays is formed on an entrance side of the infrared rays;

a film that is arranged opposing the light guiding region and the light shielding region, and that absorbs the infrared rays reaching the film through the light guiding region, and converts the infrared rays to heat;

a sensor cover that is made of metal and arranged opposing the sensor case via the film;

an infrared detection element that is arranged at a position on the film corresponding to the light guiding region; and a temperature compensation element that is arranged at a position on the film corresponding to the light shielding region, wherein the light guiding region and the light shielding region have substantially symmetrical forms with respect to the partition wall, wherein the light guiding region, the light shielding region and the partition wall are formed by fitting an infrared absorption molded body to the airspace, and wherein the film is held between the sensor case and the sensor cover.

2. The infrared temperature sensor according to claim 1, wherein the light guiding region is a substantially rectangular parallelepiped, a short axis L1 and a long axis L2 of an opening thereof in plan view having a ratio of 1:2 or more, and a light guiding length L3 of the light guiding region and the short axis L1 having a ratio of 1:1 or more.

3. The infrared temperature sensor according to claim 1, wherein an element accommodation portion that is composed of an airspace in which the infrared detection element and the temperature compensation element are accommodated is formed between the sensor cover and the film, the element accommodation portion being sealed from outside.

4. The infrared temperature sensor according to claim 1, wherein each of the infrared detection element and the temperature compensation element is a resistor having a temperature resistance coefficient.

5. The infrared temperature sensor according to claim 1, comprising a detection circuit composed of a bridge circuit including the infrared detection element, first resistance connected in series with the infrared detection element, the temperature compensation element, and second resistance connected in series with the temperature compensation element, the first resistance and the second resistance forming opposing resistance, the detection circuit employing a difference between a first middle point voltage between the infrared detection element and the first resistance and a second middle point voltage between the temperature compensation element and the second resistance as an infrared output voltage, and employing the second middle point voltage as a temperature compensation output voltage, wherein the first resistance is variable resistance whose resistance value is variable.

6. The infrared temperature sensor according to claim 5, comprising a differential amplification circuit that amplifies a differential voltage of the bridge circuit, wherein the differential amplification circuit includes amplification factor varying means that varies an amplification factor thereof, and an infrared temperature output is adjusted by adjusting the amplification factor.

7. A fixing device comprising:

a first roller as fixing means;

a second roller as pressurizing means; and a temperature sensor that detects a temperature of one or both of the first roller and the second roller, wherein the temperature sensor is an infrared temperature sensor according to claim 1.

* * * * *